United States Patent [19]

Hicks

[11] 4,004,129
[45] Jan. 18, 1977

[54] FOOD PROCESSING OVEN

[75] Inventor: Kevin Joseph Hicks, Marrickville, Australia

[73] Assignee: Auto-Bake Pty. Limited, Marrickville, Australia

[22] Filed: Aug. 19, 1975

[21] Appl. No.: 605,958

[30] Foreign Application Priority Data

Dec. 27, 1974 Australia .................. 8666/74

[52] U.S. Cl. .................. 219/388; 99/386; 99/443 C; 219/411; 219/413
[51] Int. Cl.² .................. F27B 9/06
[58] Field of Search .......... 219/388, 410, 411, 412; 99/331, 332, 386, 443 C; 432/143, 147, 148; 34/14

[56] References Cited
UNITED STATES PATENTS

| | | | |
|---|---|---|---|
| 3,249,741 | 3/1966 | Mills | 219/388 |
| 3,310,007 | 3/1967 | Ford | 219/388 |
| 3,502,020 | 3/1970 | Bressickello | 99/443 C |
| 3,515,854 | 6/1970 | Williams | 219/388 |
| 3,545,095 | 12/1970 | Dokonpil et al. | 34/14 |
| 3,559,564 | 2/1971 | Turner et al. | 99/332 |
| 3,601,582 | 8/1971 | Boisfleury | 219/388 |

Primary Examiner—Volodymyr Y. Mayewsky
Attorney, Agent, or Firm—Ladas, Parry, Von Gehr, Goldsmith & Deschamps

[57] ABSTRACT

A biscuit making oven comprises a fabricated chamber externally insulated and having bottom entry and exit openings for an endless conveyor arranged partly inside and outside of the oven. Inside the oven the conveyor has horizontal runs which carry the biscuits to be baked progressively down through the oven so that they encounter three stages of heating to perform different stages in the baking process. These stages of heating are independently controllable despite the absence of baffles in the oven. The oven has the advantage that it does not require to be constructed at site but can be factory fabricated and simply used at site.

8 Claims, 3 Drawing Figures

3-PHASE 4-WIRE SYSTEM

FOOD PROCESSING OVEN

FIELD OF THE INVENTION

This invention relates to an oven for use in food processing and, in particular, for use in the baking of cookies or biscuits. For convenience, the invention is herein described in the context of biscuit manufacture but it will be appreciated that the oven in accordance with the invention has wider application.

STATE OF THE ART

Biscuit manufacture requires that heat should be applied to the biscuit mix at different levels or for different periods of time during three distinct stages in the baking process. Thus, the biscuit mix should be subjected to an initial heating stage when it first enters the oven for the purpose of controlling the size and color required of the finished product. Thereafter, the mix should be subjected to a second heating stage for the purpose of baking the biscuit through, and to a final heating stage for the purpose of baking the underside of the biscuit and completing the baking. The heat level applied at the various stages should be controllable and variable to accommodate different mixes.

Ovens which are customarily employed in the baking of biscuits comprise a tunnel-like structure and an endless conveyor which passes in a straight line through the tunnel. Heating elements are strategically located at various zones within and along the length of the tunnel for the purpose of restricting or controlling heat transfer from one zone to another. Various controls (including air draft controls) are associated with the ovens for the purpose of regulating heat levels within the various zones. As the biscuits travel through the oven they encounter each of the zones, in turn, and each stage of the baking process is carried out in a unique one of the zones of the oven.

The ovens as above described and as currently employed have proved to be generally satisfactory in terms of applying a controlled amount of heat to a biscuit during the various stages of a baking process. However, they are inherently large in size, and they are therefore costly in terms of both capital expenditure and siting area required.

Attempts have been made to avoid the abovementioned size and cost problems by the construction of an oven which employs a conveyor belt which is driven through a serpentine path within a single oven chamber. Such an oven utilizes an upper electric heating element for applying heat during the initial baking stage and a lower bank of gas fired burners for supplying heat for the second and final baking stage. The oven is naturally purpose built on site.

However, this oven construction has been found to present its own problems. Whilst the size and hence the cost of the oven is reduced, it has been found that no effective control can be exerted over heat required for the various baking stages, due to the migration of heat from one zone of the oven chamber to another.

Such heat migration occurs to an uncontrollable extent due to the more compact nature of the oven and a desired change in the heat applied in one region of the oven automatically influences the conditions in other regions of the oven. This results in the baking process being adversely affected as the temperatures of the different baking zones of the oven cannot be adjusted in isolation to their optimum values.

OBJECT OF THE INVENTION

An object of the invention if the provision of an improved compact food processing oven in which different cooking stages can be carried out at different controlled temperatures without adversely influencing the cooking stages being carried out in other zones of the oven.

THE INVENTION

The present invention provides an oven for use in food processing and which comprises:
 a. an oven chamber,
 b. a product conveyor which is arranged to be driven in a serpentine path through the oven chamber,
 c. First, second and third electric heating elements disposed within the chamber for directing radiant heat onto products during first, second and third stages respectively of conveyance of the products through the chamber,
 d. control devices in circuit with the first and third heating elements and arranged independently to maintain the radiant heat emission from such elements at preselected adjustable levels,
 e. a further control device associated with the second heating element and arranged to provide for a predetermined heat level within the second stage zone of the chamber, said further control device incorporating a temperature sensor which is located within the second stage zone of the chamber and said further control device providing a time-proportional anticipatory control action against heat migration from the first and third stage zones of the chamber to the second stage zone.

PREFERRED FEATURES OF THE INVENTION

The control devices associated with the first and third heating elements preferably comprise temperature regulator switches and the further control device preferably comprises an electronic temperature level controller which serves to control switching of a supply current to the second heating element. The temperature sensor associated with the further control device preferably comprises a thermocouple, the junction end only of which is located within the oven chamber.

The first, second and third heating elements respectively may each comprise a bank of elements electrically connected in parallel with each bank being connected to its own supply.

Also, further heating elements are preferably provided within the chamber for the sole purpose of maintaining an even heat balance across the width of the oven chamber. Such (further) heating elements function as regulatory elements and they are connected in circuit with appropriate balance control devices.

The oven in accordance with the invention and as above defined provides for accurate temperature control over a baking process and this does in turn permit the use of relatively skilled labour for monitoring a baking operation. Thus, operators may be furnished with instructions as to settings for the various controls which are appropriate to a particular food product mix. Also, inasmuch as the oven may be regarded as having self-regulatory control, automatic setting of the control devices can be effected by way of various codings. The coding may be contained on punch cards or in a memory device.

The invention will now be described in more detail, by way of example, with reference to the accompanying drawings, in which:

IN THE DRAWINGS

PREFERRED EMBODIMENT

Figure 1:
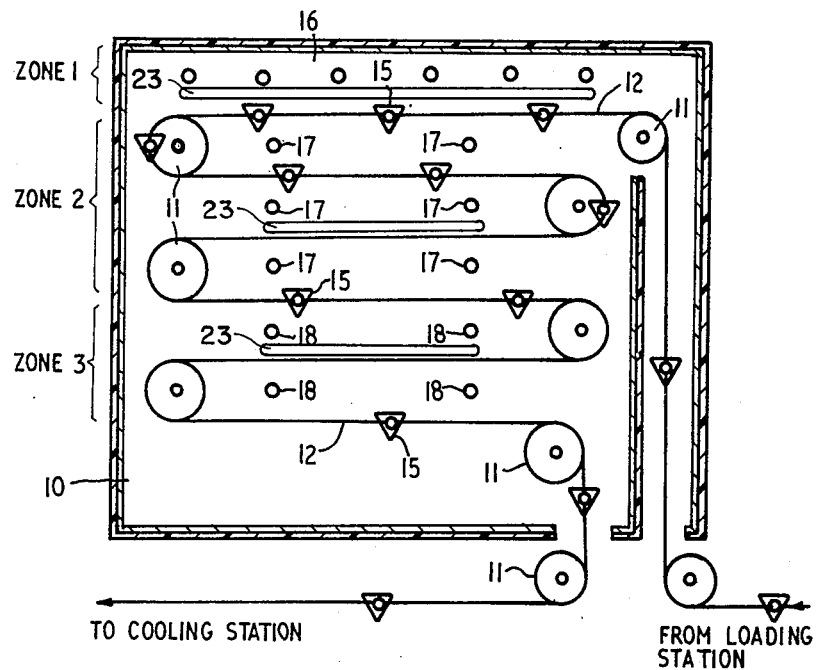
FIG. 1 shows a schematic side elevation view of a cubical oven.
Figure 2:
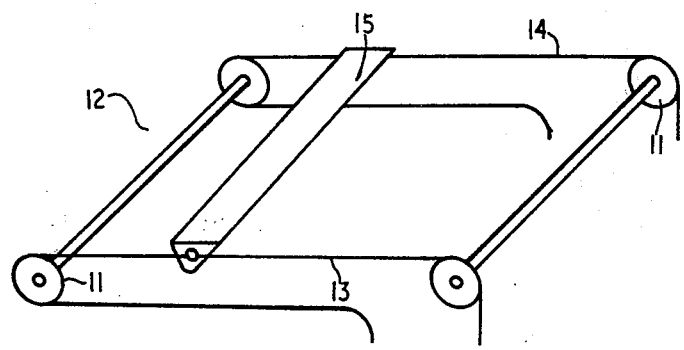
FIG. 2 shows a scrap view of a conveyor which passes in a serpentine fashion through the oven; and, FIG. 3 shows circuit connections applicable to various heating elements which are located within the oven.

As shown in FIGS. 1 and 2, the oven comprises a parallelepiped oven chamber 10 through which biscuits are conveyed in order that they might be subjected to a baking process. A series of shaft mounted sprockets 11 are located within and outside the chamber 10, and the sprockets serve to support a product conveyor 12 which passes in a serpentine fashion through the chamber.

The product conveyor, as indicated in FIG. 2, comprises a pair of spaced-apart link-chain type conveyor bands 13 and 14 which suspend a series of laterally extending biscuit support trays 15. The support trays 15 are pivotably mounted to the conveyor bands and they are counterbalanced in such manner that they maintain a substantially constant orientation during their passage through the oven chamber.

Although not so shown in the drawings, the product conveyor would normally incorporate endless conveyor chains which serve to carry the trays 15 through a biscuit mix loading station and through a subsequent cooling zone and unloading station. Such stations are well known in the art and as they form no part of the invention they are not illustrated or further described.

A bank of six "first" heating elements 16 are located at the upper end (zone 1) of the oven chamber, the elements being in the form of rod type electric radiant heating elements extending across the width of the chamber above the top run of the trays.

Another bank of six "second" heating elements 17 are located within an intermediate portion (zone 2) of the chamber, and a further bank of four "third" heating elements 18 are located toward the lower end of the chamber (zone 3). Elements 16, 17 and 18 extend parallel to one another.

The respective banks of elements 16, 17 and 18 are disposed within the chamber for radiating heat onto the biscuits during their passage through first, second and third stages of conveyance of the products through the chamber. The respective stages are indicated as zones 1, 2 and 3 in FIG. 1 of the drawings, but it will particularly be noticed that there are no structural divisions (e.g., baffles) between the various stages. These are avoided because the use of independently controllable banks of radiant heating rods enables the heating to which the biscuits are subjected in the different zones to be regulated without noticeably influencing the heating in other adjacent zones.

The conveyor 12 moves at a substantially constant adjustable velocity through the oven chamber 10.

Figure 3:
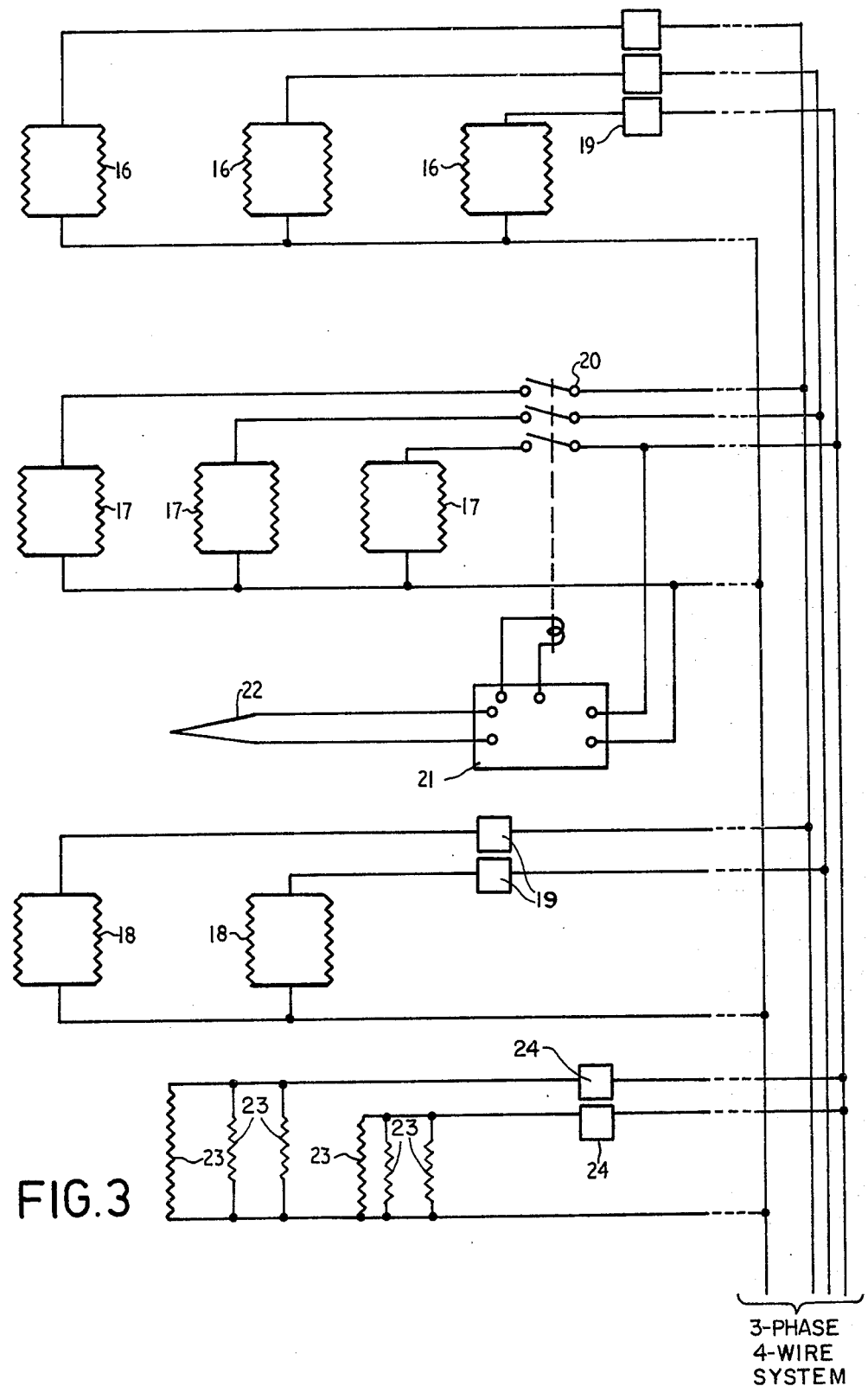

As is shown in FIG. 3 of the drawings, the first and third banks 16 and 18 of heating elements are connected to a common electrical current supply through control devices 19 in order that heat emission from such elements might be maintained at a preselected (but variable) level. Such control devices comprises Type TYJ Series Sunvic "Simmerstat" regulators (marketed by Sunvic division of A.E.I.).

The second bank 17 of heating elements is connected to the supply of electrical current through a contactor 20 which is energized by way of a controller 21 and can break a 45 amp current. The controller 21 functions to control energization of the heating elements 17 and so as to provide for maintenance of a predetermined heat level within the second stage zone of the oven chamber.

The controller 21 comprises an electronic temperature controller having a variable time-proportional anticipatory control function, and it incorporates a thermocouple type temperature sensor 22 which locates within the second zone of the oven chamber. A controller which has been found suitable for this purpose is currently commercially available and is a "Mini" temperature controller Series 19–90 produced by Pye Ether Ltd.

In order to provide for maintenance of a balanced heating effect across the full width of the oven chamber 10, a further bank of three heating elements 23 are located one along each side of the chamber.

The upper heating element of each three elements 23 is arranged horizontally immediately beneath the six elements 16 and perpendicularly to them. Its ends are directly beneath the two end elements 16. In similar manner the middle heating elements 23 are arranged horizontally directly beneath the ends of the middle pair of heating elements 17 with their ends adjacent those of the elements 17. The lower heating elements 23 are arranged in corresponding manner directly beneath the ends of the upper pair of heating elements 18.

The top bank of six elements 16 is switchable in three pairs as shown in FIG. 3. Each of the elements 16, 17 and 18 has a dissipation of 1500 watts. The two upper elements 23 have a dissipation of 900 watts and the lower two elements 23 have dissipations of 250 watts. When in use each of the elements radiates a deep red heat. The function of the two banks 23 is to compensate for any difference in heat losses at the sides of the oven chamber so that the biscuits adjacent the ends of the trays 15 are heated at their edges despite the loss of heat from the terminal portions of the heating elements at which the electrical connections to them are made.

The oven chamber 10 has a fabricated metal sheet wall covered with thermal insulation and the only two openings in it are those necessary beneath for entry and exit of the continuously moving conveyor 12. The trays are of triangular section and are also fabricated from steel sheets so that they present a horizontal smooth top surface on which the biscuits rest.

The overall length of the oven is 11½ ft; its height is 4 feet 10 inches (which includes ½ foot riser legs to which wheels can be fitted and which provide the necessary ground clearance. The legs can be removed and are not shown as they form no part of the invention); and its width is 3¼ feet which includes external control knobs. The only external connection necessary is the electrical lead for supplying power to the oven.

OPERATION OF PREFERRED EMBODIMENT.

On switching on, the oven requires about 15–25 minutes run-up time to stabilize its interior temperature. As the oven chamber is insulated and closed, apart from the bottom openings for the conveyor 12, it heats up to provide a generally uniform stable air temperature within it of 150° to 200° C according to the settings applied and which are varied to suit the biscuit mix and cooking cycle. The speed of the conveyor is also variable and set.

The temperature settings of the heating elements are chosen to fulfill the following functions.

The bank of six heating elements 16 serves to control the expansion of the incoming biscuit mix which tends to spread on the trays 15 until a firm crust is formed by the exterior layer drying out. This contains further expansion. The first two pairs of heaters are individually set to determine when this occurs and thus fix the mix shape of the final biscuit. The third pair of heating elements is set to impart the required color to the finished biscuit by further heating the exterior, dried-out layer.

The biscuits then make three runs through the central region (zone 2) of the oven. This zone is temperature stabilized to a temperature normally 50° – 70° C lower than the top region of the oven, by the thermocouple 22 and the contactor 20. The spacing of the heaters 17 is such that uniform cooking of the biscuit throughout its thickness occurs in this zone and the desired texture is imparted to it.

The final stage of cooking takes place in the third zone which is normally at 50° – 70° C less than the middle zone 2. Its temperature is determined by the setting of the heater elements 18. Preferential cooking of the undersides of the biscuits occurs in this zone as a result of the temperature of the trays 15, on which they rest, being greater than the surrounding air because of their retention of heat from the higher temperature zones through which they previously passed.

In a typical example of use of the apparatus the trays, which are 2 feet long and 4½ inches wide, are each loaded from an extruder with six pieces of biscuit dough mix. The conveyer runs continuously at constant speed and at any one time there are 120 trays in the oven. Each tray spends 15–20 minutes in the oven from which it will be appreciated that the output is 2160 biscuits an hour.

From the above description it will be appreciated that the oven has the following advantages. It is fabricated under factory conditions and transported to site of use (rather than being purpose built in situ). It is compact, easy to use and versatile. It requires only one electrical point and produces no fumes so that chimneys, gas connections, draughts and flues and unpleasant smell are avoided. It is easy to clean. If it is required to move the oven, it can be done without dismantling it.

I claim:

1. A baffleless commercial biscuit baking oven comprising a casing, thermal insulation on said casing, two bottom openings to said casing, an endless spaced apart link-chain type conveyor passing through said openings and having a baking first section inside said casing and a loading and unloading section outside said casing, closely spaced baking trays on said conveyor, horizontally extending runs of said conveyor in said first section, electrical radiant heating elements disposed in three vertically spaced zones in said casing, first controls outside said casing determining the setting of the heating elements in the first zone, second controls outside said casing determining the setting of the heating elements in the second zone, third controls outside the casing determining the setting of the heating elements in the third zone, temperature stabilizing means including a temperature sensor inside the second zone and a switch controlling the current supply to the heater elements of the second zone in response to said temperature sensor, and means for maintaining the trays horizontal during their passage through the oven; whereby, when the oven is in use, each tray is transported downwards through the oven and a different stage of baking is performed in each of the three zones, the first zone determining the size and top color of the finished biscuit, the second zone determining the interior texture of the finished biscuit, and the third zone determines the color of the underside of the biscuit.

2. An oven as set forth in claim 1, in which the trays are metal, are pivotally supported at their ends and have weights holding them so that their top surfaces, on which the biscuits are baked, remain horizontal during movement through the oven.

3. An oven as set forth in claim 2, in which the casing shape is horizontally extending parallelepiped and the openings are provided, alongside one another, at one end portion of the underside of the casing.

4. A baffleless commercial biscuit baking oven comprising a casing, thermal insulation on said casing, two bottom openings to said casing, an endless spaced apart link-chain type conveyor passing through said openings and having a baking first section inside said casing and a loading and unloading section outside said casing, closely spaced baking trays on said conveyor, a first horizontal row of parallel electrical heater rod elements extending above and perpendicularly to a horizontal top run of the conveyor so as to provide a first zone, three horizontal rows of fewer electrical heater rod elements extending above respective intermediate horizontal runs of the conveyor to provide a second zone, two horizontal rows of electrical heater rod elements extending above a bottom two horizontal runs of the conveyor to provide a third zone, first controls outside said casing determining the setting of the heating elements in the first zone, second controls outside said casing determining the setting of the heating elements in the second zone, third controls outside the casing determining the setting of the heating elements in the third zone, temperature stabilizing means including a temperature sensor inside the second zone and a switch controlling the current supply to the heater elements of the second zone in response to said temperature sensor, and means for maintaining the trays horizontal during their passage through the oven; whereby, when the oven is in use, each tray is transported downwards through the oven and a different stage of baking is performed in each of the three zones, the first zone determining the size and top color of the finished biscuit, the second zone determining the interior texture of the finished biscuit, and the third zone determines the color of the underside of the biscuit.

5. An oven as set forth in claim 4, in which the heater elements of the first, second and third zones are parallel and the sides of the oven are provided with independently controllable banks of horizontally extending electrical heater rods which extend perpendicularly to said elements adjacent the ends thereof, and said second controls exercise a time-anticipatory control function.

6. An oven as set forth in claim 4, in which the trays are of triangular section and are pivotted at their ends to two parallel chains providing the conveyor and which pass around sprockets inside the oven.

7. An oven as claimed in claim 4, in which the speed of the conveyor is adjustable and the heater elements of the third zone are provided with means responsive to the motion of the conveyor and which prevent them from being switched on unless the conveyor is in motion.

8. An oven as claimed in claim 4, in which the elements of the second zone are controlled by an electronic temperature controller responsive to the output of temperature sensing means in the second zone and which has a variable time-proportional anticipatory control function.

* * * * *